US008024412B2

(12) United States Patent
McCann et al.

(10) Patent No.: US 8,024,412 B2
(45) Date of Patent: Sep. 20, 2011

(54) USER INTERFACE READING EMAIL CONVERSATIONS

(75) Inventors: Robert E. McCann, Seattle, WA (US);
Jorge Pereira, Seattle, WA (US);
Nathan E. Breskin-Auer, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 12/031,973

(22) Filed: Feb. 15, 2008

(65) Prior Publication Data

US 2009/0210800 A1 Aug. 20, 2009

(51) Int. Cl.
*G06F 15/16* (2006.01)
(52) U.S. Cl. ........ 709/206; 715/752; 709/203; 709/200; 707/3
(58) Field of Classification Search .................... 715/752
See application file for complete search history.

(56) References Cited

U.S. PATENT DOCUMENTS

| | | | | |
|---|---|---|---|---|
| 6,330,589 | B1 | 12/2001 | Kennedy | 709/206 |
| 7,130,885 | B2 | 10/2006 | Chandra | 709/206 |
| 7,475,110 | B2 * | 1/2009 | Kirkland et al. | 709/204 |
| 2003/0101065 | A1 | 5/2003 | Rohall | 705/1 |
| 2003/0120720 | A1 * | 6/2003 | Montero | 709/203 |
| 2004/0119740 | A1 | 6/2004 | Chang et al. | 345/751 |
| 2005/0132012 | A1 | 6/2005 | Muller | 709/206 |
| 2005/0193074 | A1 | 9/2005 | Garland | 709/206 |
| 2005/0222985 | A1 * | 10/2005 | Buchheit et al. | 707/3 |
| 2005/0223061 | A1 * | 10/2005 | Auerbach et al. | 709/206 |
| 2006/0036696 | A1 | 2/2006 | Maresh | 709/206 |
| 2006/0053204 | A1 | 3/2006 | Sundararajan | 709/206 |
| 2006/0161849 | A1 * | 7/2006 | Miller et al. | 715/744 |
| 2007/0005715 | A1 | 1/2007 | LeVasseur | 709/206 |
| 2007/0180040 | A1 * | 8/2007 | Etgen et al. | 709/207 |
| 2007/0282956 | A1 * | 12/2007 | Staats | 709/206 |

FOREIGN PATENT DOCUMENTS

| | | |
|---|---|---|
| JP | 2000-285044 A | 10/2000 |
| KR | 2001-0113180 A | 12/2001 |
| KR | 2002-0020519 | 3/2002 |
| KR | 2002-0026232 A | 4/2002 |

OTHER PUBLICATIONS

Gina Denille Venolia, Understanding Sequence and Reply Relationships within Email Conversations: A mixed-Model Visualization, Apr. 10, 2003, vol. No. 5, Issue No. 1, pp. 361-368.*
Supporting Email Workflow, Gina Danielle Venolia et al., ftp://ftp.research.microsoft.com/pub/tr/tr-2001-88.pdf, revised Dec. 2001.

(Continued)

*Primary Examiner* — Ashok B Patel
*Assistant Examiner* — Andrew Goldberg
(74) *Attorney, Agent, or Firm* — Merchant & Gould P.C.

(57) ABSTRACT

Emails modeled as conversations are displayed in a user interface that enables users to read and interact with the emails within a conversation intuitively. Conversation breaks, such as those in an in-reply-to relationship between messages, are presented utilizing extra spaces between displayed message parts, excerpts of parent messages displayed above the message following the break, and/or graphical elements like broken connectors. Relationships between a user selected message and its parent within the conversation defined relationship are illustrated using graphical elements or schemes that focus on the selected message to avoid confusion due to information overload.

18 Claims, 9 Drawing Sheets

OTHER PUBLICATIONS

Grand Central Usenet: The Design and Evaluation of a Thread-Based Usenet Browser, Carman Neustaedter et al., http://66.102.1.104/scholar?hl=en&lr=&q=cache:G_eRMJk1-A4J:pages.cpsc.ucalgary.ca/~carman/research/GrandUsenetCentral.pdf+mail+conversation+%2B+tree+%2B+display+message+%2B+user+interface+%2B+branching, pp. 1-9.

Understanding Sequence and Reply Relationships within Email Conversations: a Mixed-Model Visualization, Gina Danielle Venolia et al., http://delivery.acm.org/10.1145/650000/642674/p361-venolia.pdf?key1=642674&key2=0660125911&coll=ACM&dl=ACM&CFID=6615863&CFTOKEN=54283096, vol. No. 5, Issue No. 1, pp. 361-368.

Conversation Map: An Interface for Very-Large-Scale Conversations, http://66.102.1.104/scholar?h1=en&1r=&q=cache:oEI8UDH-q5IJ:www.sims.berkeley.edu/~sack/Pubs/sack-jmis.pdf+mail+conversation+%2B+tree+%2B+display+message, pp. 1-23.

Conversation-Based Mail, Douglas E. Comer et al, http://delivery.acm.org/10.1145/10000/6515/p299-comer.pdf?key1=6515&key2=7470125911&coll=ACM&d1=ACM&CFID=6615863&CFTOKEN=54283096, ACM Transactions on Computer Systems, vol. 4, No. 4, Nov. 1986, pp. 299-319.

International Search Report issued Jul. 6, 2009 in PCT/US2009/031411 filed Jan. 19, 2009.

* cited by examiner

USER INTERFACE READING EMAIL CONVERSATIONS

BACKGROUND

Exchanged messages are treated in conventional email systems similar to regular mail. This data model addresses single, standalone, one way communications effectively. However, increasingly email is no longer standalone, or simple one way communication. A given email is now often part of a large protracted "conversation", an interrelated series of messages that, when viewed over time and in aggregate, more closely resembles an interactive discussion between people and groups.

While some indication of reply and/or forwarding relationship between messages may be provided in conventional systems, the user interfaces do not typically present the user a visually user-friendly representation of the messages in an email trail or conversation with their relationships that includes an intuitive way for an e-mail user to read and interact with an e-mail conversation of random complexity.

E-mail conversations are logically formed by e-mail messages linked to each other via an in-reply-to relationship. Typically, a sender sends an original e-mail to a set of recipients, which may reply to that message and then to subsequent replies thus building a conversation (a tree of e-mail messages, effectively). Building a user interface to display all these messages and their in-reply-to relationships is not an easy task, especially as the number of multiple replies to the same message increases (also called "branch points") and the conversation becomes less linear.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing an intuitive way for an e-mail user to read and interact with an e-mail conversation of random complexity. A user interface is provided for displaying conversation breaks effectively by utilizing spaces between displayed messages and the way messages are displayed. Relationships between messages are also displayed in an efficient manner utilizing graphic elements that are adjusted based on user indication of selection of a message.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
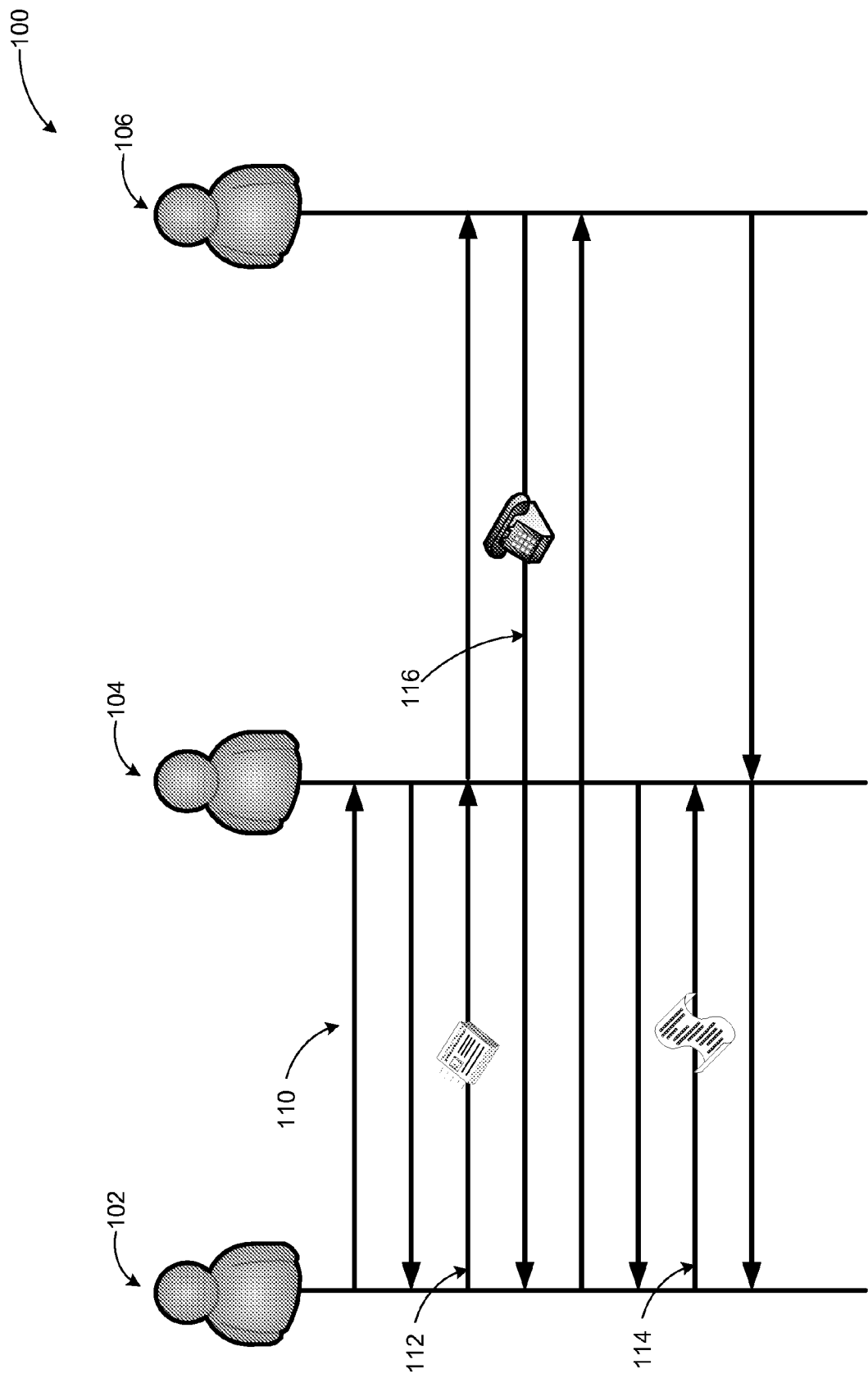
FIG. 1 illustrates a conceptual diagram of exchanged emails like a conversation.

As briefly described above, emails modeled as a conversation in an email application may be presented in an intuitive way for an e-mail user to read and interact with an e-mail conversation of random complexity. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

The term 'message' as used herein includes—in addition to regular email message—electronic mail system objects like invitations, meeting notifications, notifications of updates to meeting dates/times, messages that acknowledge receipt of messages or indicate a message has been received and read, messages that indicate a message has been received and discarded before being read, as well as a number of other artifacts that may appear to be part of how a human conversation may be modeled. For example, based on an email conversation one may schedule a meeting. The process of scheduling the meeting may involve multiple iterations of people accepting or rejecting the meeting proposal, as well proposing new times/dates/places. Some users may consider the invitation/accept/reject objects as "messages"—thereby part of the conversation—whereas other users may not.

Referring to FIG. 1, a conceptual diagram of exchanged emails like a conversation is illustrated in diagram 100. Diagram 100 shows three users of an email system exchanging messages. The messages exchanged between users 102, 104, and 106 may include regular text-based messages (100), image or graphics documents 112, textual attachments 114, or audio messages 116. As shown in the diagram, the messages may be sent by one user to another or multiple others (e.g. user 102 to user 104 or users 104 and 106). Responses to the original message may be received from different parties, which themselves may be sent to all participants or to the originator. Thus, the exchanged messages may have a complicated structure, while all together representing a conversation among the participants (users 102, 104, 106).

In a system according to embodiments, not all messages that are part of the same conversation need to be stored in the same folder because the folder structure may group the messages differently. For example, a folder hierarchy may have a folder for claims made by an insurance client, and another for questions from that client. A conversation may be a claim followed by a series of questions. Furthermore, the conversation itself may have properties (e.g. a descriptive name for the conversation, the size of the conversation, annotations about the conversations such as if the conversation is complete, or a default folder to store messages for that conversation). Thus, a conversation may include messages from a single folder, multiple folders, and does not need to be a storage for its messages so that properties of that conversation can be preserved. As discussed below, a conversation may be implemented as an independent object within the email system along with its own attributes in addition to its email having their own attributes.

According to other embodiments, a logic conversation object may be employed to organize messages as part of a conversation. The conversation object may be realized as a physical artifact or generated on demand. When a message is introduced into an email system, it may include an indication of which conversation (or conversation branch) it is a part of. According to further embodiments, a message's conversation may be determined through a variety of techniques, if that information is not directly provided by the message.

A conversation object may have associated properties, and it is a grouping or aggregation mechanism for messages. It is distinct, because the messages in the conversation have a specific order, that it not statically created by a user (like in a folder). The conversation object may also be automatically created whenever a message is introduced that is determined to not be an element of an existing conversation.

Some conventional email systems have categories for messages, but a conversation is distinct because a conversation is an inherent property of a message and is not directly set. An order of messages in a conversation is critical, conversations are not statically created, and conversations have properties that transcend the messages within a conversation. For example, a category may be a property of a conversation.

Figure 2:
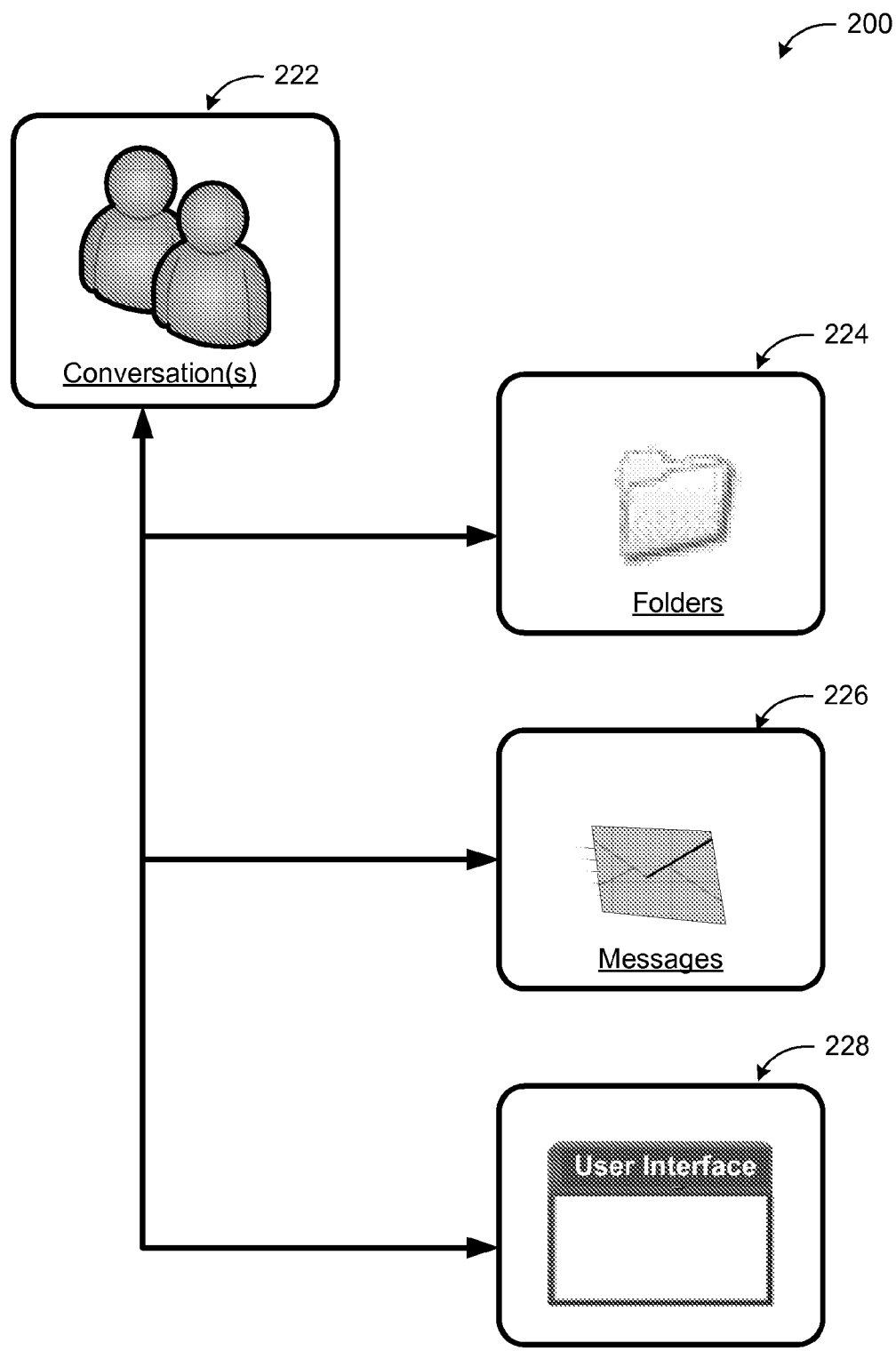
FIG. 2 is another conceptual diagram illustrating a conversation's relationships with other aspects of an email application.

FIG. 2 is another conceptual diagram 200 illustrating a conversation's relationships with other aspects of an email application. An email application may have many aspects such as scheduling items, complementary user interfaces for presenting attachments (e.g. audio players, video players, image editors, etc.), and so on. Major aspects related to conversation are discussed here.

As a structured aggregation of messages, conversation 222 interacts with folders 224 of an email application, which provide categorized storage for the emails. As mentioned previously, conversation 222 may include messages from several folders. Conversation 222 is, of course, an aggregation of a subset of messages 226. It is created (or started) by a message that does not belong to an existing conversation and includes only messages that are related to each other by virtue of being part of a common exchange.

Conversation 222 also interacts with user interface 228 presenting the messages and their relationship so that a user can easily determine an order and a relationship of the messages among each other. Conversation properties as well as message properties may be presented to complement each other for a user-friendly display.

As mentioned previously, a conversation may have properties of its own (in addition to the properties of message within the conversation). Conversation properties may include any attribute that can be associated with a conversation. Some examples of conversation properties include a default folder name for the messages, a "mute" property (pushing the conversation to the background without eliminating it), a list of categories associated with the conversation, a number of messages within the conversation, a date and time of a first message initiating the conversation, a list of participants in the conversation, a total size of the messages within the conversation, and so on.

Figure 3:
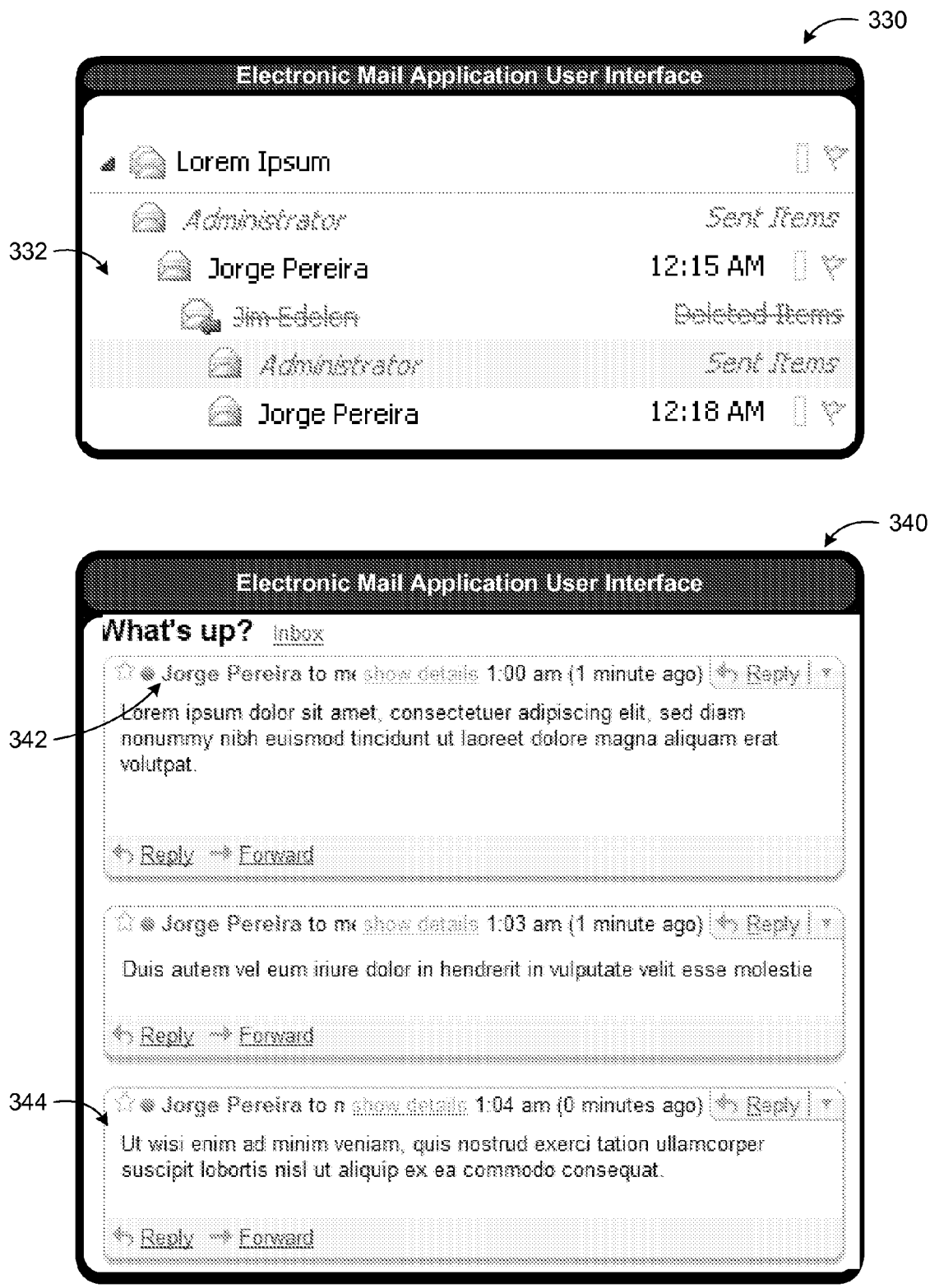
FIG. 3 illustrates example email application user interfaces displaying messages as part of a conversation.

FIG. 3 illustrates example email application user interfaces displaying messages as part of a conversation. Some email user interfaces may present messages as part of a conversation, but are limited or overwhelming in the amount of information provided to the user. In example diagram 300, messages part of a conversation initiated by the email from user *Lorem Ipsum* are presented in tree view 332 using indentations for each reply. Individual messages may also be displayed on a separate view pane upon selection by the user from tree view 332.

While this approach helps the user navigate through the messages in the conversation, it fails to provide information about messages when there is a conversation break (i.e. a message is not in-reply to a preceding one). Furthermore, if additional information about each message is provided such as a portion of the content, subject line, etc., the user interface may become overwhelming for the user and the relationships may be lost in the amount of information displayed.

User interface 340 is an example for one end of the spectrum of user interfaces. User interface 340 lacks almost any information about the relationship between messages of the conversation. The example conversation in user interface 340 is titled "What's Up?", but that is pretty much all the information provided to the user. Messages are listed with originators (342), time, and a portion of the content for each message. In this example, the messages are ordered chronologically with the newest message 344 at the bottom of the list. However, it is almost impossible to determine from the user interface, which message is in-reply to another and other relationships between the messages.

Figure 4:
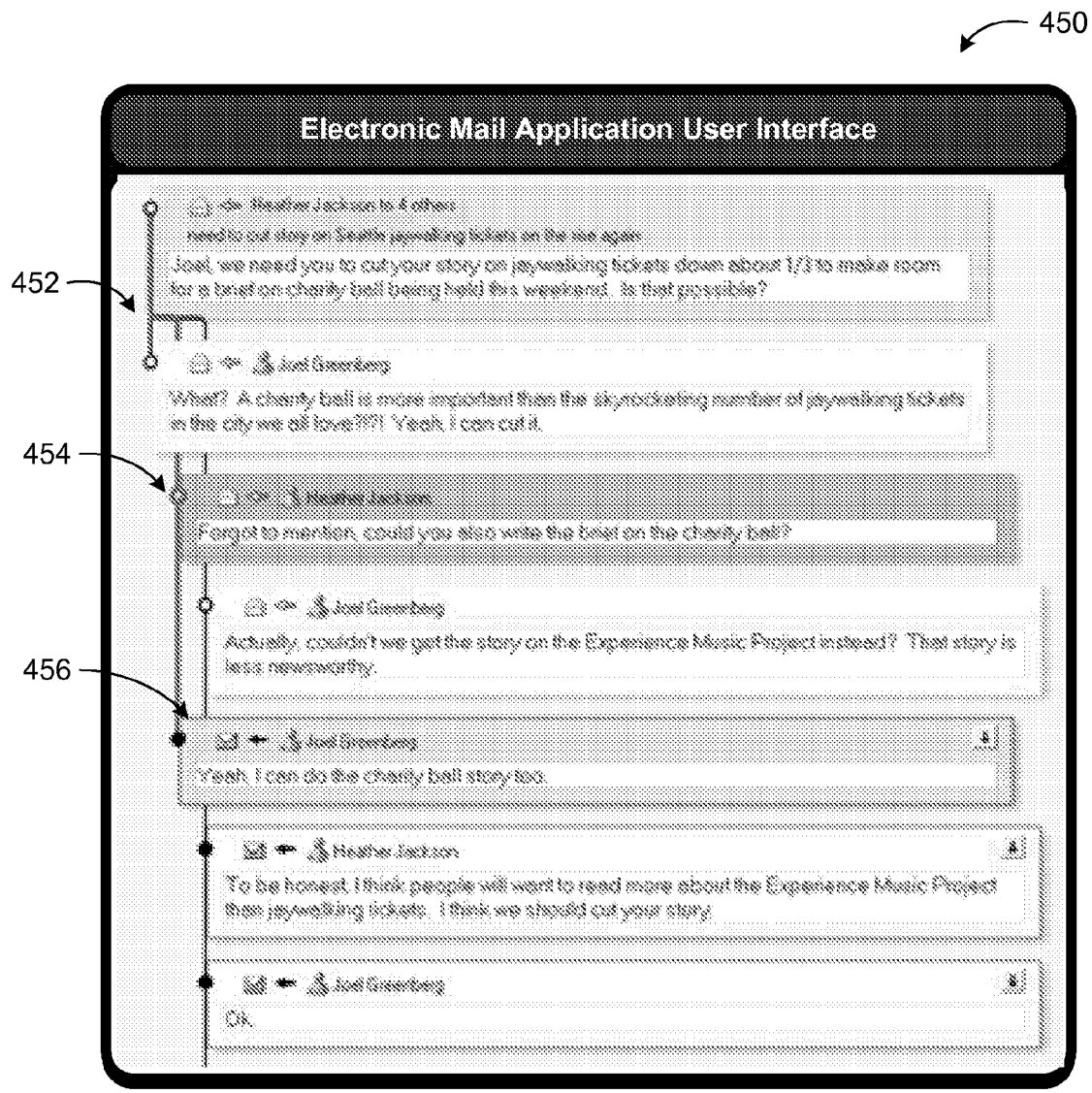
FIG. 4 illustrates another example email application user interface displaying messages as part of a conversation.

FIG. 4 illustrates another example email application user interface displaying messages as part of a conversation. User interface 450 is an example of the other end of the information spectrum. Graphical elements 452 and 454, as well as coloring or shading schemes are used to present all in-reply relationships at the same time. Thus, it may be difficult for the user to decipher the relationships between messages such as message 456 and its parent intuitively.

Moreover, a user is more likely to focus on a smaller group of messages rather than the whole conversation and try to figure out which message was in-reply to another or which messages were sent in-reply to a selected message. Thus, the overwhelming information about all of the messages is likely to confuse the user and prevent them from obtaining the information they are actually looking for.

Figure 5:
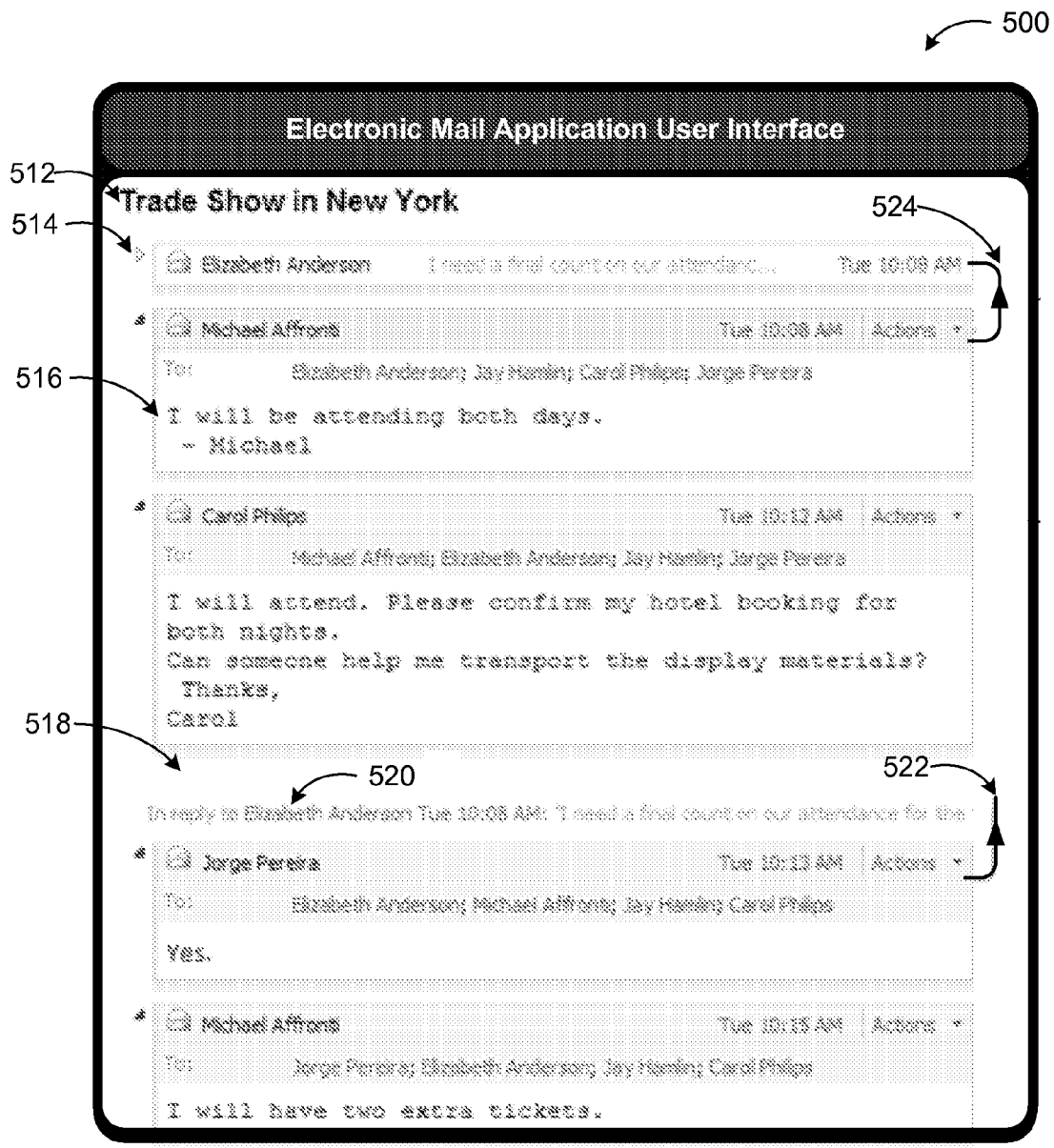
FIG. 5 illustrates an email application user interface according to embodiments displaying messages as part of a conversation.

FIG. 5 illustrates an email application user interface according to embodiments displaying messages as part of a conversation. As discussed above, conventional user interfaces either provide little to no information about conversation relationships between messages or provide an overabundance of information causing confusion or inability to focus on a desired message by the user.

A user interface according to embodiments focuses on most important piece of information to display to the user, allowing the user to quickly get the context (the relationship of the selected message to another within the conversation) while keeping the user interface simple and intuitive. Such a user interface (e.g. user interface 500) may display all of the messages in a conversation, rendered one after another, in the same "page", which is scrollable. Each "box" (also called "message-parts") 514 corresponds to an email message and displays the unique parts of the message body (516), based on the message's relationship with its parent (e.g. an in-reply-to relationship). By displaying only the unique portion of the message body, the user is further enabled to determine a flow of conversation. The message parts in a conversation may be sorted by any criterion: chronologically with newest on top or bottom, in deep traversal order of the conversation tree, and the like. The latter ordering approach minimizes a number of conversation breaks that are displayed in the page.

If the user selects a particular conversation, the user interface 500 may begin displaying the conversation with the most recent message or the message that initiated the conversation on top (message 514). A title of the conversation ("Trade Show In New York") 512 may be identified explicitly by the initiating message. If the message does not explicitly identify the conversation it is part of, the information may be derived from the message (e.g. from a subject of the message). Conversation properties may also be set by the initial message. Alternatively, the originator of the initial message or an administrator may be provided with options to set attributes and properties of the conversation (e.g. title, default folder, importance level, etc.).

When new messages are added to the conversation, any aggregated properties of the conversation affected by the introduction of the new message may be updated. If the user selects a particular message in the conversation, that message may be displayed in detail in a separate view pane.

Two aspects of the user interface enable a user to derive conversation information from the displayed messages in an optimized fashion. The first one is presentation of conversation breaks 518. As mentioned previously, a conversation break occurs when two messages within a conversation do not follow each other according to the conversation relationship in the current ordering of the messages (e.g. in-reply-to relationship in messages ordered chronologically). A conversation break in a user interface according to embodiments may be presented utilizing one or more of three elements: extra space between the messages around the conversation break (518), an excerpt 520 of the parent message (e.g. to which the message is in-reply to) right above the message following the conversation break 518, and a graphical element indicating a relationship of the message following the conversation break. In the example user interface 500, a partial arrow (or connector icon) 522 is used to indicate that the message following the conversation break is related (e.g. in-reply-to) another message. This also draws attention to the fact that a conversation break has occurred at that location.

The second aspect of a user interface according to embodiments is display of message relationship(s) for only a message to which the user's attention is drawn to. The user may indicate he/she is interested in a message by hovering their mouse over the message (cursor focusing), selecting the message (clicking on the message part), and so on. Once the message of interest is determined, its parent according to the conversation relationship may be determined and the relationship displayed graphically such as by connector icon 524. If no message is selected initially, the relationship between the top message and its child may be displayed until another message is selected or focused on.

By displaying the message relationship in a relatively small portion of the user interface for a message of interest only, confusion due to an intricate system of three dimensional overlays, graphical elements, and indentations is avoided. The relationship may of course be presented in various ways such as on the left side of the user interface, over the displayed messages (using transparent graphical elements), or other color/graphical schemes. The important aspect is though, maintaining the display elements simplistic and focused to the message of interest to the user. Moreover, additional information (to a reasonable degree) may be provided by the scheme used to display the message relationship. For example, a thickness of the graphical elements or color may indicate different types of relationship or other attributes of the messages (sent vs. received, etc.).

In order to maintain the user interface focused on the user's messages of interest and prevent confusion due to numerous elements, message parts, and so on, how the messages are displayed may also be determined based on the relationships of the messages. For example, if recipient portion of the messages in the conversation are substantially the same that message part may be removed from display. Similarly, only content that is unique to each message may be displayed. Embodiments are not limited to these two examples. Other simplification and focusing approaches may be implemented using the principles described herein along with the graphic, color, and other schemes for representing relationships of the message within their parental structure.

In addition to the conversation related parts, the email user interface 500 may include standard components such as selectable controls, links to other functionalities such as calendar. Selectable controls user interface may include textually and/or graphically represented controls for standard operations as well as conversation-related operations such as filtering message within a conversation based on conversation properties or conversation-related message properties. Email user interface 500 may also include a pane for displaying a list of available conversations with their properties (muted, in order of their origination date, size, etc.).

According to some embodiments, messages are associated within a conversation using an "in-reply-to" relationship. Thus, a group of messages of a conversation may be defined as the logical tree formed by a set of the replies, starting always with a single "new" message. Embodiments are not so limited, however. A conversation may also be defined explicitly by a user (or administrator). Users may select conversations for a given message by a property (e.g. conversation ID), with any number of attributes, such as a color, a text, or a number. When a user sends out a message, he/she may explicitly set the conversation ID on the message (e.g. assign the message the red color). Any messages that are subsequent replies by other recipients may automatically carry the conversation ID (red), unless the recipient decides to change the property while sending the reply. User interface 500 may be configured to display relationships between the messages similarly using the principles described herein.

Figure 6:
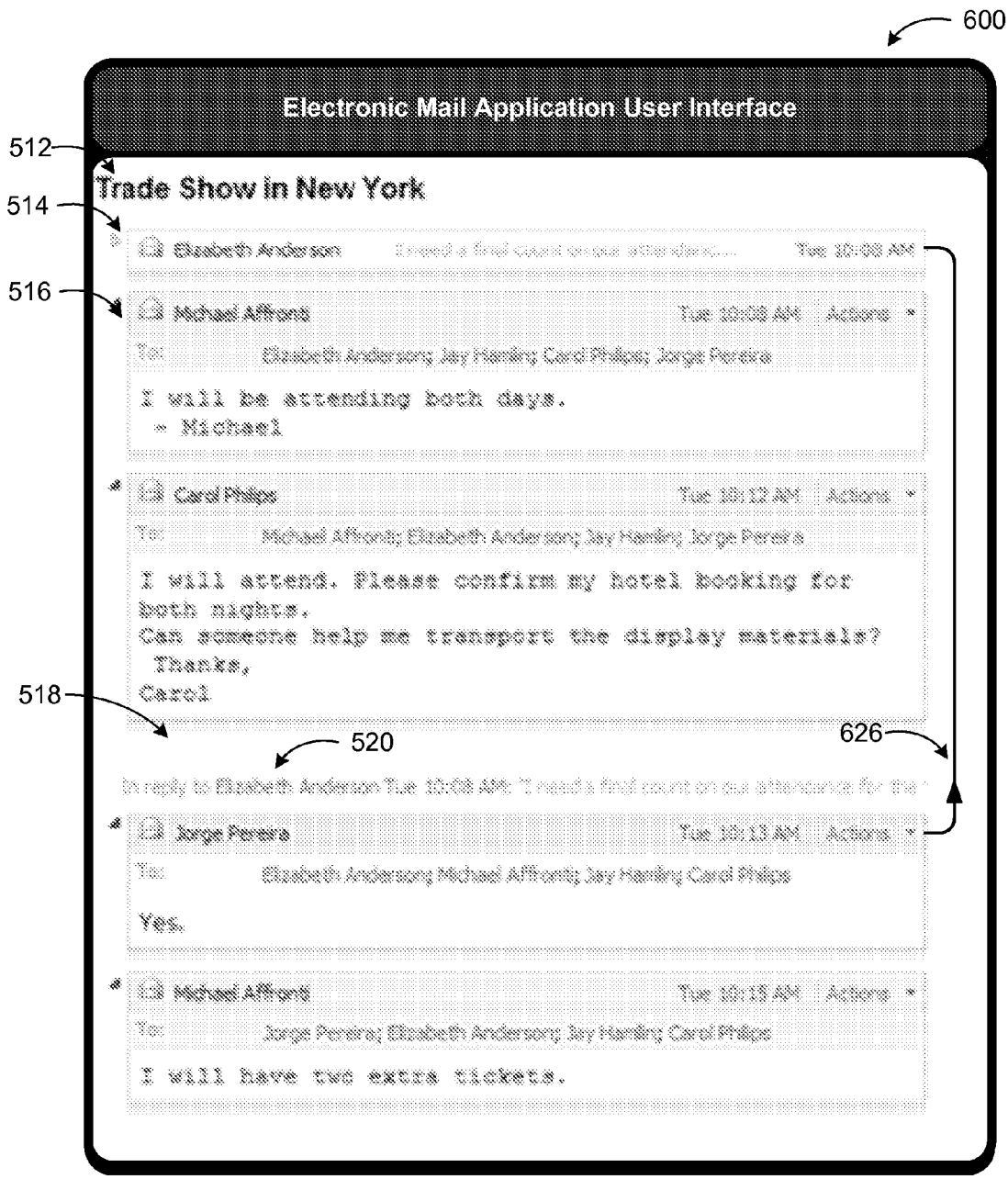
FIG. 6 illustrates the email application user interface of FIG. 5 displaying messages as part of a conversation upon selection of another message by the user.

FIG. 6 illustrates the email application user interface of FIG. 5 displaying messages as part of a conversation upon selection of another message by the user. Thus, user interface 600 includes most of the same elements of user interface 500 of FIG. 5. Differently from FIG. 5, however, in user interface 600, the message following the conversation break 518 has been selected (or focused on). Therefore, the user interface presents the relationship between that message and the top message 514 with graphical element (arrowed connector) 626.

As discussed previously, graphical elements may be used to represent relationships (typically a parental structure) between messages in a number of ways in conjunction with other color, shape, etc. schemes. Graphical element 626 is one example of such a scheme. The arrowed line connector may not only be used to show the relationship between a message and its immediate parent, but also to indicate relationships between multiple messages in a parental structure. For example, a portion of the arrowed line connector (or any other graphical element) between the current message and its selected parent or immediate parent may be represented with a darker color (or thicker line) while the remaining portions connecting the rest of the parental structure may be represented with a lighter color (thinner line). That way, the entire relationship can be presented while the selected portion is focused and made prominent.

As mentioned above, embodiments may be implemented using a variety of graphical, color, and shape schemes using the principles described herein, and are not limited to the example elements such as extra space, arrowed connectors, and one-line excerpts illustrated in the example user interfaces. Furthermore, the user interfaces may be configured differently than illustrated in the example figures.

The described message aggregations, conversations, categories, components, properties, and scenarios in FIGS. 5 and 6 are exemplary for illustration purposes. An email system employing a user interface for reading email conversations may be implemented using additional or fewer components and features using the principles described herein. Other scenarios and communication types are also possible in a system like the one described here.

Figure 7:
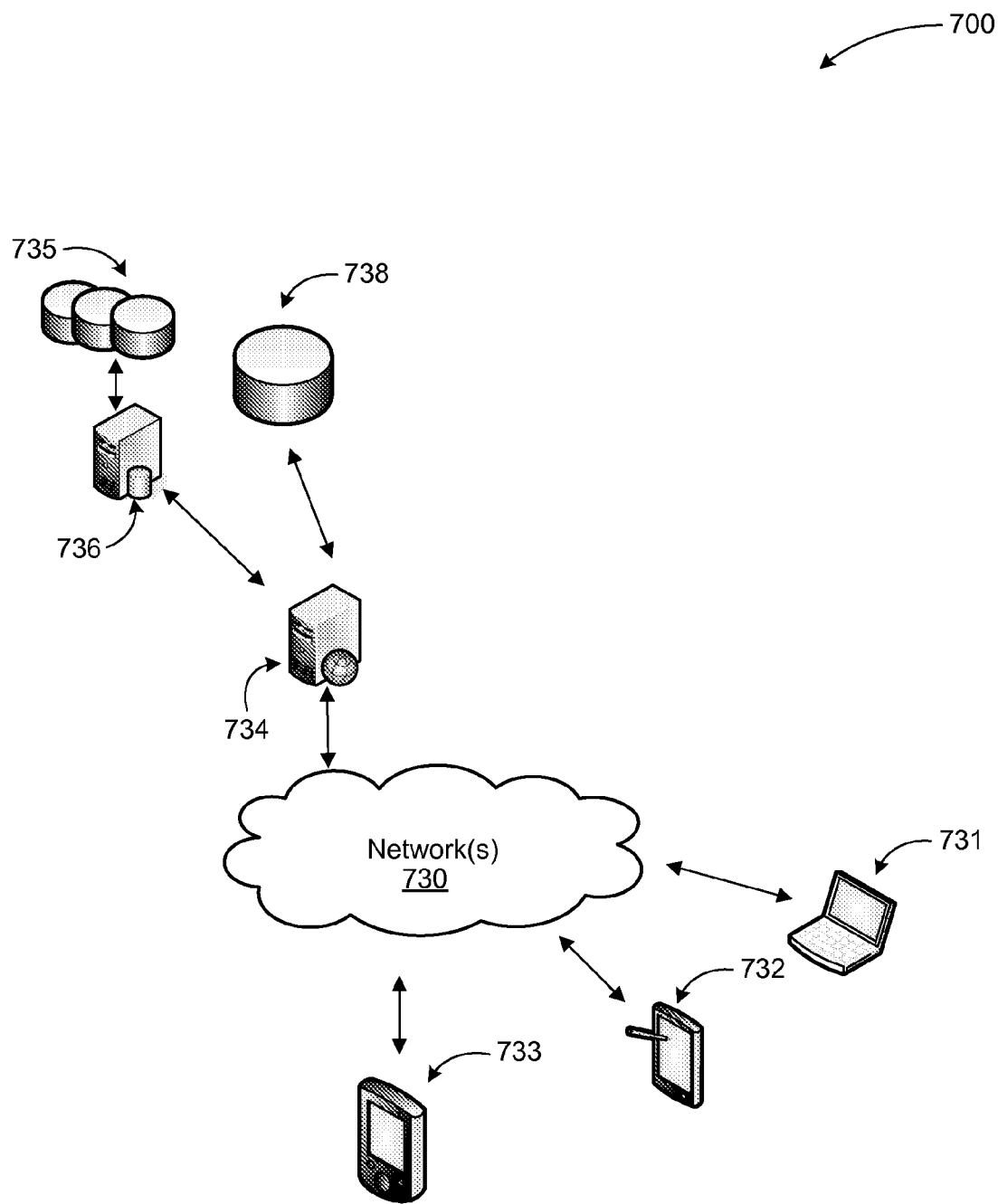
FIG. 7 is an example networked environment, where embodiments may be implemented.

FIG. 7 is an example networked environment, where embodiments may be implemented. A user interface for reading email conversations may be implemented in application(s) executed locally on a single computing device or in a distributed manner over a number of physical and virtual clients and servers. The application(s) may also be implemented in un-clustered systems or clustered systems employing a number of nodes communicating over network(s) 730.

Such a system may comprise any topology of servers, clients, Internet service providers, and communication media. Also, the system may have a static or dynamic topology. The term "client" may refer to a client application or a client device. While a networked system executing an application with a user interface for reading email conversations may involve many more components, relevant ones are discussed in conjunction with this figure.

Email applications providing user interfaces for email conversations may be implemented in individual client devices 731-733 or executed on a server (e.g. server 734) and accessed from anyone of the client devices (or applications). In a hosted email service managed by one or more servers, messages and other data may be stored in system data stores such as data store 738 and accessed directly by the clients or in data stores 735 managed by database server 736.

Network(s) 730 may include a secure network such as an enterprise network or a cellular network, an unsecure network such as a wireless open network, or the Internet. Network(s) 730 provide communication between the nodes described herein. By way of example, and not limitation, network(s) 730 may include wired media such as a wired network or direct-wired connection, and wireless media such as acoustic, RF, infrared and other wireless media.

Many other configurations of computing devices, applications, data sources, data distribution systems may be employed to implement an email system according to embodiments. Furthermore, the networked environments discussed in FIG. 7 are for illustration purposes only. Embodiments are not limited to the example applications, modules, or processes.

Figure 8:
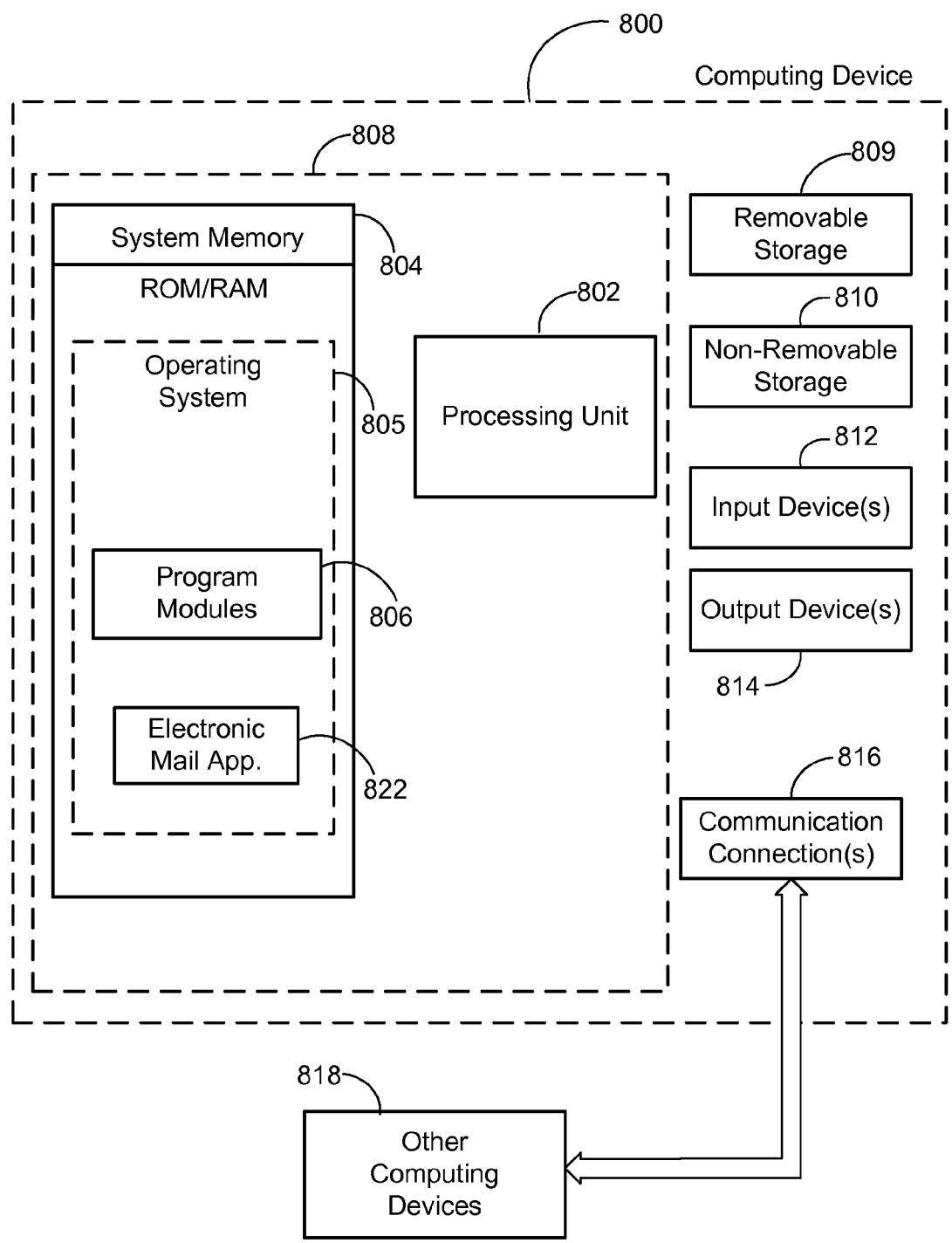
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment is illustrated, such as computing device 800. In a basic configuration, the computing device 800 may be a computer executing an email application and typically include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of a networked personal computer, such as the WINDOWS® operating systems from MICROSOFT CORPORATION of Redmond, Wash. The system memory 804 may also include one or more software applications such as program modules 806 and email application 822.

Email application 822 is configured to aggregate messages in conversations according to various approaches as described previously, and to provide a user interface for an e-mail user to read and interact with an e-mail conversation of random complexity intuitively. This basic configuration is illustrated in FIG. 8 by those components within dashed line 808.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and non-volatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well known in the art and need not be discussed at length here.

The computing device 800 may also contain communication connections 816 that allow the device to communicate with other computing devices 818, such as over a wireless network in a distributed computing environment, for example, an intranet or the Internet. Other computing devices 818 may include server(s) that execute applications associated with a data access and directory service. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
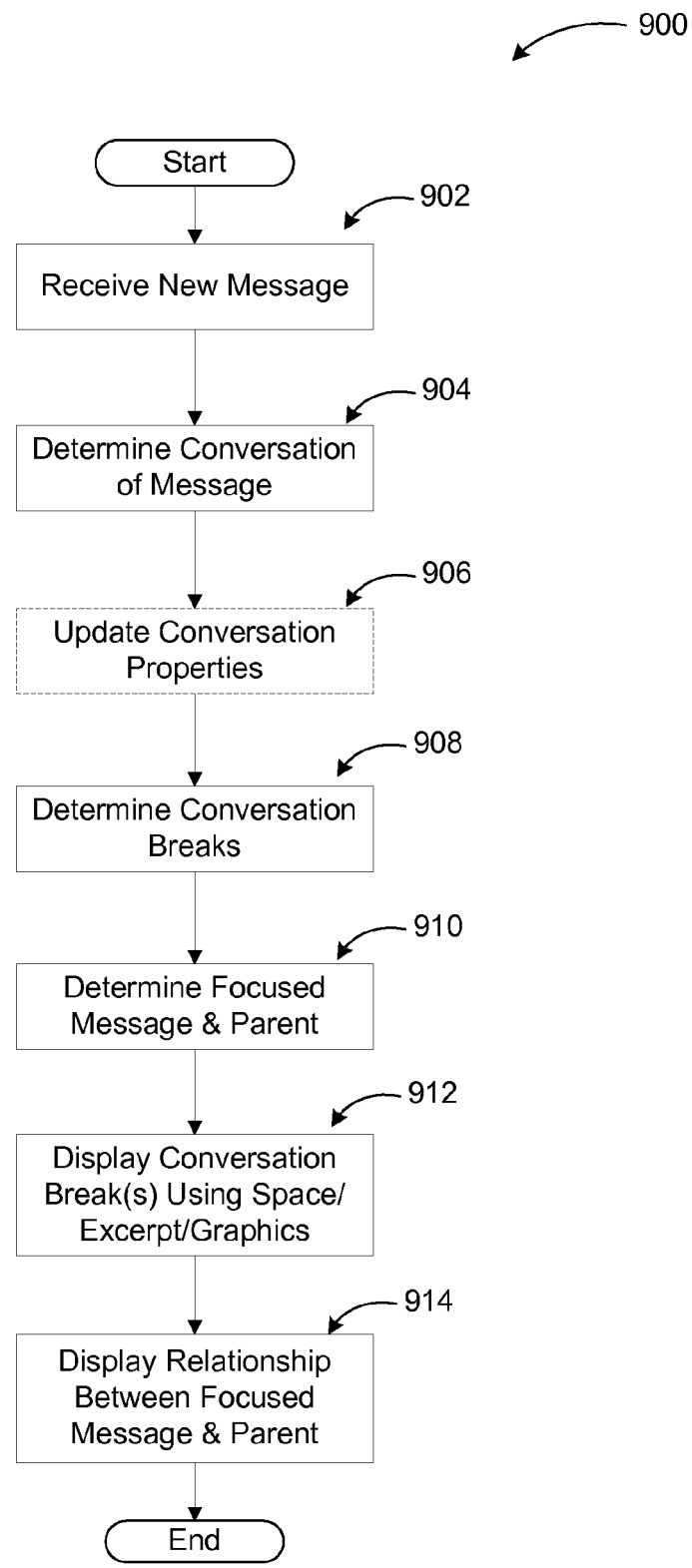
FIG. 9 illustrates a logic flow diagram for a process of displaying emails according to a conversation in a user interface according to one embodiment.

FIG. 9 illustrates a logic flow diagram for process 900 of displaying emails according to a conversation in a user interface according to one embodiment. Process 900 may be implemented in a local or distributed email application.

Process 900 begins with operation 902, where a new message is received by the email application. The email may belong to an existing conversation or may originate a new conversation. For relevance and simplicity, it is assumed that the received message belongs to an existing conversation. Processing advances from operation 902 to operation 904.

At operation 904, the conversation to which the message belongs to is determined. As described previously, this may be through explicit identification of the conversation in the message or to derivation of the conversation identification from the message (e.g. subject line, reply-to relationship, etc.). Processing moves from operation 904 to optional operation 906, where aggregated conversation properties are updated based on the newly received message as explained previously. Processing proceeds from optional operation 906 to operation 908.

At operation 908, conversation breaks are (re)determined. In an existing conversation, conversation breaks (where a message flow according to an in-reply-to relationship, etc. is broken) may already be known, but they may change based on the newly received message. Processing moves from operation 908 to operation 910, where a focused message and its parent according to a defining relationship criterion of the conversation (such as in-reply-to relationship) may be determined. A focused message may be one that the user selects by clicking on the message in the user interface, by hovering over the message with a cursor (also called a mouse-over), or through any other method such as selection of a message through keyboard entry. Processing advances from operation 910 to operation 912.

At operation 912, the conversation is displayed with the message parts containing unique content from the body of their corresponding messages being presented in a scrollable page according to a chronological order, a deep traversal order of a conversation tree structure, or an order according to a user assigned message attribute. The messages may include an electronic mail message, an audio recording, an instant message, a video recording, an image, or a graphic. The displayed message parts may also include selectable controls for performing actions associated with each message. The conversation breaks are presented employing extra spaces between message parts, excerpts from parent message above a child message following the break, and/or graphical elements (e.g. a broken connector icon). The conversation breaks may also be presented by employing a color scheme and a shading scheme applied to the message parts before and after the break and the extra spacing. Moreover, the message parts may also be presented employing indentations, tabbing, or sandwiching. Processing moves from operation 912 to operation 914.

At operation 914, a relationship between the focused message and its parent (e.g. the message to which the focused message is in-reply to) is displayed on the user interface presenting the conversation. This may be accomplished by using simplistic graphical elements such as a connector icon with an arrow on one side of the user interface such that user's attention is only drawn to that particular relationship and not confused by a complicated web of relationship displays. The connector may be deployed to the right side of the user interface next to the message parts, left side of the user interface next to the message parts, or over the message parts using a transparent coloring scheme. A thickness, a location, a texture, and/or a color of the connector may be used to provide additional information associated with message attributes, message relationships, and a relationship types.

The operations included in process 900 are for illustration purposes. Displaying emails according to a conversation in a user interface may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a user interface that displays messages as part of a conversation, the method comprising:

receiving a new message;

determining a conversation associated with the received message, wherein messages forming the conversation conform to a predefined relationship with at least one other message within the conversation, wherein the predefined relationship is an "in-reply-to" relationship within the conversation;

determining a conversation break within the conversation, the conversation break comprising a plurality of elements, presented in the user interface, between at least one preceding message having the "in-reply-to" relationship within the conversation and a message which lacks the "in-reply-to" relationship within the conversation with respect to the at least one preceding message, the plurality of elements comprising extra spacing between the message having the "in-reply-to" relationship and the message which lacks the "in-reply-to" relationship, an excerpt from a parent message, the excerpt immediately preceding the message which lacks the "in-reply-to" relationship with respect to the at least one preceding message, and a graphic element appended only to the message which lacks the "in-reply-to" relationship;

determining a message of interest for a user; and displaying the conversation within the user interface by:

presenting message parts associated with each message within the conversation according to a selected order, wherein each message part includes a user name associated with a message, a time of receipt, and a portion of body of the message that is unique compared to a parent of the message based on the "in-reply-to" relationship; and presenting a relationship of the message of interest within a parental structure of the messages forming the conversation visually.

2. The method of claim 1, wherein the message parts are presented in a scrollable page according to one of: a chronological order and a deep traversal order of a conversation tree.

3. The method of claim 1, wherein the message of interest is determined based on one of: receiving a user selection of a message part and a user focusing of a cursor on a message part.

4. The method of claim 1, wherein a relationship of the message of interest with its parent is presented employing at least one from a set of: a color scheme, a graphic scheme, an indentation scheme, and a shading scheme.

5. The method of claim 4, wherein the graphic scheme includes an arrowed connector between the message of interest and its parent.

6. The method of claim 5, wherein the connector is displayed on one of: right side of the user interface next to the message parts, left side of the user interface next to the message parts, and over the message parts using a transparent coloring scheme.

7. The method of claim 5, wherein one of a thickness and a color of at least a portion of the connector are used to provide additional information associated with at least one from a set of: message attributes, message relationships, and a relationship type.

8. The method of claim 1, wherein the message parts are presented employing one of: indentations, tabbing, and sandwiching.

9. The method of claim 1, wherein the graphic element used to indicate the conversation break includes at least one from a set of: a partial arrowed connector, a straight line, a dashed line, and an icon.

10. A computing device capable of executing an email application for providing a user interface that displays messages as part of a conversation, comprising:

a memory;

a data store; and a processor coupled to the memory and the data store, wherein the processor is utilized to:

determine a desired order of display for the messages in the conversation, wherein a subset of the messages in the conversation are related to each other by an "in-reply-to" relationship;

determine a conversation break within the conversation, the conversation break comprising a plurality of elements, presented in the user interface between at least one preceding message having the "in-reply-to" relationship within the conversation and a message which lacks the "in-reply-to" relationship within the conversation with respect to the at least one preceding message, the plurality of elements comprising extra spacing between the message having the "in-reply-to" relationship and the message which lacks the "in-reply-to" relationship, an excerpt from a parent message, the excerpt immediately preceding the message which lacks the "in-reply-to" relationship with respect to the at least one preceding message, and a graphic element appended only to the message which lacks the "in-reply-to" relationship;

determine a message of interest for a user; and display the conversation within the user interface by:

presenting message parts associated with each message in a scrollable page according to the desired order, the page identified by the conversation title, wherein each message part includes a user name associated with a message, a time of receipt, and a portion of body of the message that is unique compared to a parent of the message based on the "in-reply-to" relationship; and presenting a relationship of the message of interest with another message, to which the message of interest is in-reply-to, using at least one from a set of: a color scheme, a graphic scheme, an indentation scheme, and a shading scheme.

11. The computing device of claim 10, wherein the title of the conversation is determined from the originating message through one of: explicit definition and derivation from a subject line of the originating message.

12. The computing device of claim 10, wherein the processor is further utilized to:

present the conversation break by employing at least one of: a color scheme and a shading scheme applied to the first and second message parts and the extra spacing between the first and second message parts.

13. The computing device of claim 10, wherein the processor is further utilized to:

present the relationship of the message of interest with at least the other message, to which the message of interest is in-reply-to, using a graphic connector element, wherein at least one from a set of: a color, a location, and a texture of the connector element is used to provide additional information associated with an attribute of the relationship.

14. The computing device of claim 10, wherein the message of interest is determined by one of: a user click, a user mouse-over, and a user selection through a keyboard entry on a message part within the page.

15. A computer-readable storage device with instructions stored thereon for providing user interface that displays messages as part of a conversation, the instructions comprising:

receiving a new message;

determining a conversation associated with the received message based on an "in-reply-to" relationship of the message to another message within the conversation;

updating conversation properties based on the received message, the conversation properties including at least one from a set of: a title of the conversation, an order of messages within the conversation, and a structure of messages within the conversation;

determining a desired order of display for the messages;

determining conversation breaks within the updated conversation based on the desired order of display, wherein each of the conversation breaks comprises a plurality of elements, presented in a user interface, between at least one preceding message having the "in-reply-to" relationship within the conversation and a message which lacks the "in-reply-to" relationship within the conversation with respect to the at least one preceding message, the plurality of elements comprising extra spacing between the message having the "in-reply-to" relationship and the message which lacks the "in-reply-to" relationship, an excerpt from a parent message, the excerpt immediately preceding the message which lacks the "in-reply-to" relationship with respect to the at least one preceding message, and a graphic element appended only to the message which lacks the "in-reply-to" relationship;

presenting message parts that are unique for each message based on a comparison of each message with others within the conversation in a scrollable page according to the desired order such that a display of the conversation reduces user confusion due to numerous elements, wherein the scrollable page is identified by the conversation title, wherein each message part includes a user name associated with a message, a time of receipt, and a portion of body of the message that is unique compared to a parent of the message based on the "in-reply-to" relationship;

determining a message of interest based on one of: user selection and user focusing on a message part within the page; and presenting a relationship of the message of interest with another message, to which the message of interest is in-reply-to, using a graphic scheme.

16. The computer-readable storage device of claim 15, wherein the desired order includes one of a chronological order, a deep traversal order of a conversation tree structure, and an order according to a user assigned message attribute.

17. The computer-readable storage device of claim 15, wherein the displayed message parts include selectable controls for performing actions associated with each message.

18. The computer-readable storage device of claim 15, wherein the messages include at least one from a set of: an electronic mail message, an audio recording, an instant message, a video recording, an image, and a graphic.

* * * * *